M. RAY.
MOTOR VEHICLE FOR TRAVERSING MARSH LANDS.
APPLICATION FILED OCT. 13, 1920.
1,400,984.
Patented Dec. 20, 1921.
2 SHEETS—SHEET 1.
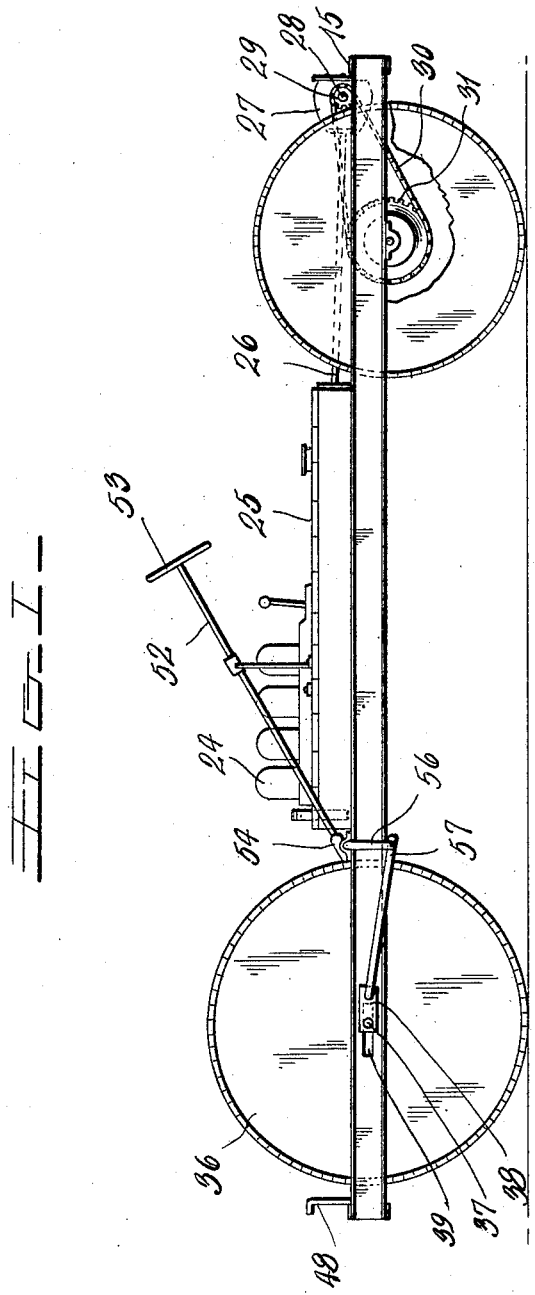
Inventor
Malcom Ray
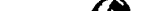
Attorney M. RAY.
MOTOR VEHICLE FOR TRAVERSING MARSH LANDS.
APPLICATION FILED OCT. 13, 1920.
1,400,984.
Patented Dec. 20, 1921.
2 SHEETS—SHEET 2.
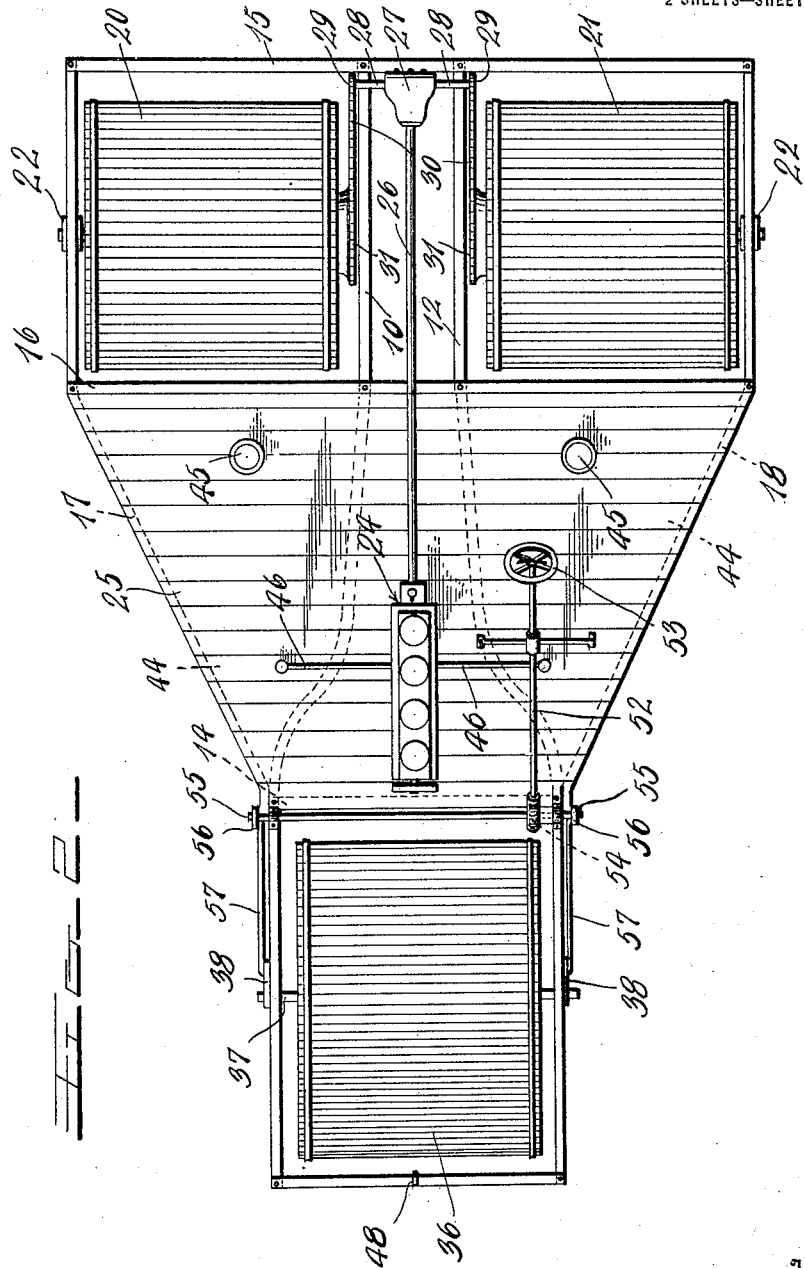
Inventor
Malcom Ray
Attorney

UNITED STATES PATENT OFFICE.

MALCOM RAY, OF ORANGE, TEXAS.

MOTOR-VEHICLE FOR TRAVERSING MARSH-LANDS.

1,400,984. Specification of Letters Patent. Patented Dec. 20, 1921.

Application filed October 13, 1920. Serial No. 416,600.

*To all whom it may concern:*

Be it known that I, MALCOM RAY, a citizen of the United States, residing at Orange, in the county of Orange and State of Texas, have invented certain new and useful Improvements in Motor-Vehicles for Traversing Marsh-Lands; and I do hereby declare the following to be a full, clear, and exact description of the invention, such as will enable others skilled in the art to which it appertains to make and use the same.

This invention relates to motor vehicles for traversing marsh lands, and the object is to provide a device of the type indicated especially designed for traversing sea marshes and the low lands of the gulf coast.

A further object is to provide, in connection with a main supporting frame and an engine carried thereby, a plurality of drums mounted for rotation in the frame and driven by the engine,—with means for steering the vehicle.

A still further object is to provide, in connection with a main frame, and a pair of drums oppositely located and suitably driven,—a third drum mounted on a transverse axis, with means for varying the position of the axial member with reference to the frame, in order to guide the vehicle.

A still further object is to provide a device which shall include a plurality of water-tight drums, means for driving the drums, and means for steering the vehicle by shifting the position of the axial member of one of the drums with reference to the frame.

A still further object is to provide, in connection with a main frame, and driving means mounted therein,—a plurality of water-tight drums having their axes in approximate alinement, a third drum, a shaft for mounting the latter, slidable journal boxes for mounting the shaft in the frame, and controlling means for shifting the position of the boxes in opposite directions and thereby varying the position of the drum last named, for effecting the steering operation.

With the foregoing and other objects in view, the invention consists in the novel construction, combination, and arrangement of elements hereinafter described and claimed.

In the accompanying drawings,

Figure 1 is a view of the device in side elevation,

Fig. 2 is a top plan view.

The central portion of the main frame comprises longitudinal elements 10 and 12 deflected as shown and connected at their forward ends by a transverse member 14.

A rear transverse frame element 15 and an intermediate transverse bar 16 connect the elements 10 and 12 in the manner shown, and extend to the outer side members of the frame shown at 17 and 18. The rear drums 20 and 21 are mounted in bearings 22, all of the drums mounted in the frame being of water-tight construction. The size is immaterial, but in a machine weighing about eighteen hundred pounds and designed to carry a load of about five thousand pounds, the drums are each about three feet long, the greatest diameter being about forty-four inches.

An engine 24 is mounted above the frame work and flooring 25, the main driving shaft being shown at 26, the differential at 27 and the driven shafts at 28. The shaft members 28 carry sprocket wheels 29 driving chains 30 passing around sprocket wheels 31, rigidly mounted with reference to the drums.

The drums above described serve to impart the motive power to the vehicle, being especially serviceable in marshy ground. The speed of the drums is considerably less than the speed of the main shaft 26, in view of the relative proportions of the sprocket wheels.

The vehicle is steered by means of the forward drum 36 mounted on a shaft 37 extending through the drum, the shaft being journaled in slidable bearing boxes 38 reciprocating in the channel element shown in the drawings. The ends of the shaft 37 pass through slots 39 in the frame members, and the bearings permit of the angular movement of the shaft with reference to the longitudinal axis of the frame, in order to effect the steering operation.

A steering shaft 52 carries a wheel 53 and by means of worm gearing 54 imparts rotation to shaft 55 mounted transversely on the frame and carrying crank arms 56, oppositely turned, in the manner shown in Fig. 2, these arms having connection with pitmen 57 which in turn are pivotally connected to the aforesaid slidable boxes. As a result of this construction, the boxes are shifted in opposite directions upon the movement of the steering wheel in one direction for changing the angular position of the forward drum with reference to the longitudinal axis of the frame. The forward drum 36 is water-tight and may be of somewhat greater diameter than the drum first mentioned, in view of the mounting of drum 36 on a shaft extending through the elements of the frame, whereas, the rear drums are shown as mounted in bearings on the lower portions of the frame.

Oil tanks 44 are provided with filling connections 45 and feed pipes 46 conduct the fuel to the engine. A draft connection or attachment 48 may be provided for use in towing the vehicle, when desired.

Having thus described the invention what I claim is:—

1. In a device of the class described, a main frame, an engine mounted therein, a plurality of water-tight rotatable drums, means for driving the drums from the engine, an additional drum mounted to rotate normally on an axis extending perpendicularly of the longitudinal axis of the frame, and means for varying the angular position of the additional drum and comprising a steering shaft, a shaft actuated thereby, oppositely turned crank elements carried by the shaft last named, mounting means for the additional drum, and elements connecting the mounting means with the crank elements.

2. In a device of the class described, a main frame including side members slotted longitudinally, journal boxes slidable on the frame, a transverse shaft mounted in said boxes and extending through the slots of the frame, a drum rigid with the shaft, a transverse shaft journaled on the frame, crank arms on the shaft last named, pitmen connecting the crank arms with the journal boxes, and means for imparting movement to the second named shaft.

In testimony whereof I affix my signature in presence of two witnesses.

MALCOM RAY.

Witnesses:
LEE Z. BEDGOOD,
D. R. EVANS.